United States Patent
Kepplinger et al.

(10) Patent No.: US 6,273,933 B1
(45) Date of Patent: Aug. 14, 2001

(54) METHOD FOR BLOWING FINE PARTICLES CONTAINING METAL OXIDE INTO A REDUCING GAS

(75) Inventors: Leopold Werner Kepplinger, Leonding; Michael Nagl, Reichenau; Franz Hauzenberger, Linz; Bernhard Rinner, deceased, late of Trattenbach, by Meinhilde Embst, legal heir; Felix Wallner, Linz; Peter Brandl, Linz; Udo Gennari, Linz; Johannes Schenk, Linz, all of (AT)

(73) Assignees: Voest - Alphini Industrieanlagenbau GmbH, Linz (AT); Pohang Iron & Steel Co. LTD, South Korea; Research Institute of Industrial Science & Technology, Pohang, both of (KR)

( * ) Notice: Subject to any disclaimer, the term of this patent is extended or adjusted under 35 U.S.C. 154(b) by 0 days.

(21) Appl. No.: 09/284,176

(22) PCT Filed: Oct. 6, 1997

(86) PCT No.: PCT/EP97/05468

§ 371 Date: Jun. 14, 1999

§ 102(e) Date: Jun. 14, 1999

(87) PCT Pub. No.: WO98/15660

PCT Pub. Date: Apr. 16, 1998

(30) Foreign Application Priority Data

Oct. 8, 1996 (AT) ................................. A 1780/96

(51) Int. Cl.⁷ ...................................... C21B 11/00
(52) U.S. Cl. ............... 75/454; 75/500; 266/216; 266/197
(58) Field of Search ............ 75/500, 454; 266/216, 266/197, 267

(56) References Cited

U.S. PATENT DOCUMENTS

| 4,147,535 | * | 4/1979 | Lilja et al. | 75/454 |
| 4,490,170 | | 12/1984 | Lilja et al. | 75/26 |
| 5,226,951 | * | 7/1993 | Kepplinger et al. | 266/197 |
| 5,714,113 | * | 2/1998 | Gitman et al. | 266/267 |

FOREIGN PATENT DOCUMENTS

| 470622 | 1/1929 | (DE) . |
| 827957 | 2/1960 | (GB) . |
| 60-209430 | 10/1985 | (JP) . |
| 90/15162 | 12/1990 | (WO) . |

* cited by examiner

*Primary Examiner*—Scott Kastler
(74) *Attorney, Agent, or Firm*—Ostrolenk, Faber, Gerb & Soffen, LLP

(57) ABSTRACT

According to a process for injecting metal-oxide-containing fine particles into a reducing gas, a central material stream formed by the fine particles and a carrier gas is introduced into the reducing gas and at least one gas stream formed by a secondary gas is directed against the material stream to ensure an optimum contact of the fine particles with the reducing gas, the gas stream atomizing the material stream and the fine particles being evenly distributed within the reducing gas.

20 Claims, 2 Drawing Sheets

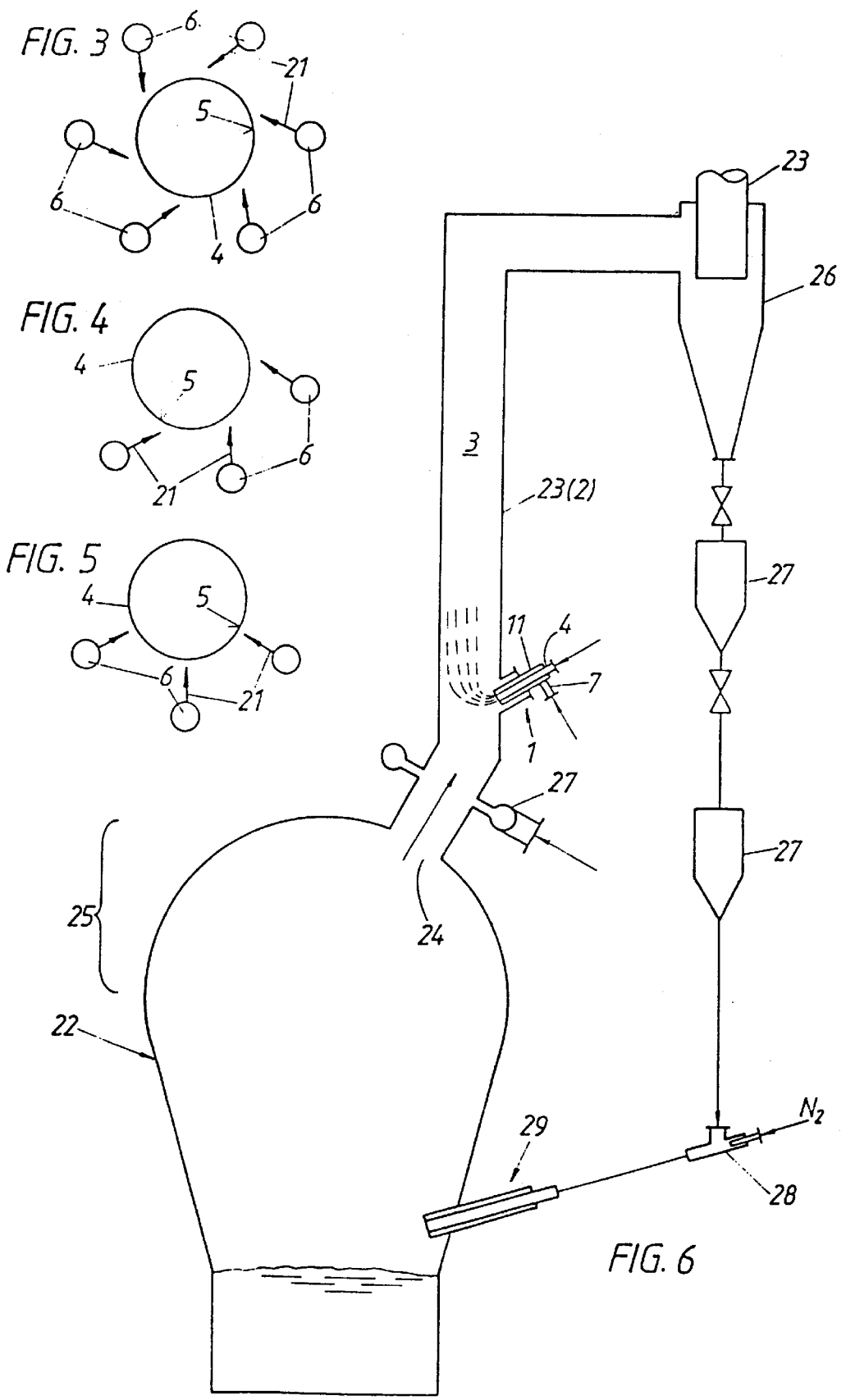

METHOD FOR BLOWING FINE PARTICLES CONTAINING METAL OXIDE INTO A REDUCING GAS

BACKGROUND OF THE INVENTION

The invention relates to a process for injecting metal-oxide-containing fine particles into a reducing gas, as well as to an arrangement for carrying out the process.

The process of introducing fine ore particles into a reducing gas duct and of reducing the ore particles during transport in the reducing gas duct is known (JP-A-62-164569). According to JP-A-62-164569, the fine ore is sucked into the reducing gas stream via a nozzle. Herein, the problem arises that the reducing gas cannot come into optimum contact with the individual metal-oxide-containing fine particles.

The fine particles entering the reducing gas stream form a compact material stream even if they are injected into the reducing gas stream by means of a carrier gas. Only after a certain distance has been covered is the material stream fanned so that only a smaller distance and, thus, only less time is available for reduction. Another disadvantage is that the material stream, due to its compactness resulting from its entering the space accommodating the reducing gas, may cause wearing of the wall delimiting said space by abrasion.

The object of the invention is to avoid these disadvantages and difficulties and to solve the technical problem of creating a process of the type described above as well as an arrangement for carrying out the process allowing to ensure an optimum contact of the individual fine particles with the reducing gas immediately after the metal-oxide-containing fine particles have entered a space accommodating the reducing gas so that each fine particle is enclosed by reducing gas, immediately after exiting the duct feeding the fine particles. This is to enable the chemical, physical and thermal reactions, which all take place starting from the surfaces of the fine particles, to proceed immediately after introduction of the fine particles into the space accommodating the reducing gas so that the time during which the fine particles are staying in this space can be optimally used. This is also to allow a minimization of the arrangement for direct reduction and an optimum utilization of the reducing gas.

SUMMARY OF THE INVENTION

According to the invention, this problem is solved by feeding a central material stream formed by the fine particles and a carrier gas into the reducing gas and by directing at least one gas stream formed by a secondary gas against the material stream, the gas stream atomizing the material stream and the fine particles being evenly distributed within the reducing gas.

The gas stream preferably imparts to the material stream a moment of rotation about the axis of the material stream, the fine particles exit from the material stream by the centrifugal forces and the latter is dispersed.

The effect of utilizing the centrifugal forces can be even intensified by the gas stream imparting to the material stream periodically fluctuating moments of rotation, preferably of different dimensions, which also allows to find the optimum moment rotation.

The gas stream is expediently directed against the material stream askew and in such a manner as to intersect the material stream and only penetrates the outer zones of the material stream, angle α between the gas stream and the material stream being periodically variable.

The gas stream is advantageously formed by inert gas, but also a reducing gas can be used therefor.

According to a preferred embodiment, the reducing gas flows past the material stream, i.e. the material stream is injected into a reducing gas stream, the material stream being expediently oriented in a direction opposite to the direction of flow of the reducing gas, preferably at an angle ranging between 100° and 160°.

Preferably, at least one gas stream is directed against the center of the material stream and penetrates the latter.

The process according to the invention can be particularly advantageously used for a reduction process characterized in that the material stream is fed into a reducing gas stream that departs from a meltdown gasifying zone in which a reducing gas containing CO and $H_2$ is formed by coal gasification and in which partially and/or completely reduced metal-containing particles are completely reduced or melted, respectively, and said reducing gas stream, after the material stream has entered, is subjected to solids separation and subsequently reacted in a reduction zone under reduction of a metal-oxide-containing ore, the fine particles separated during solids separation being supplied to the meltdown gasifying zone via a dust burner effecting an agglomeration of the fine particles.

An arrangement for carrying out the process according to the invention is characterized by the combination of the following characteristic features:

a space delimited by a wall for receiving a reducing gas, an injection nozzle entering the space through the wall, which is provided with a central pipe conducting fine particles and a carrier gas and, at the mouth of the central pipe, is provided with at least one nozzle connected to a gas duct for feeding a secondary gas, wherein the longitudinal axis of the nozzle encloses an angle α with the longitudinal center line of the central pipe, which ranges preferably between 20° and 60°.

According to a preferred embodiment, the longitudinal axis of the nozzle is oriented askew relative to the longitudinal center line of the central pipe, wherein, if the longitudinal axis of the nozzle is projected perpendicularly onto a plane laid through the longitudinal center line of the central pipe and the nozzle mouth, an angle α ranging between 20° and 60° is formed between the projected longitudinal axis of the nozzle and the longitudinal center line of the central pipe.

In this arrangement, the nozzle is expediently movably arranged at the mouth of the central pipe and, with its longitudinal axis, is capable of assuming different positions, preferably different askew positions, relative to the longitudinal center line of the central pipe.

For atomizing the material stream, it may be advantageous under certain local circumstances if several nozzles are arranged only at one half of the circumference of the mouth of the central pipe.

For material streams of larger volumes, several nozzles are expediently arranged over the entire circumference of the mouth of the central pipe in such as way as to be distributed approximately evenly.

A preferred variant is characterized in that the space for the reducing gas is formed by a pipe conducting the reducing gas, into which the injection nozzle opens from the side, the longitudinal center line of the injection nozzle and the center line of the pipe conducting the reducing gas expediently including an angle ranging between 100° and 160°.

The longitudinal axis of at least one nozzle preferably intersects the longitudinal center line of the central pipe.

A preferred application of the arrangement according to the invention is characterized in that the arrangement opens into a gas discharge pipe departing from a melter gasifier for melting and optionally completely reducing metal ores as well as for producing a reducing gas containing CO and $H_2$ by coal gasification and the gas discharge pipe opens into a solids separator, such as a cyclone, from which the solids separated in the solids separator can be recircled into the melter gasifier via a solids recircling duct and a dust burner.

BRIEF DESCRIPTION OF THE DRAWINGS

In the appended drawings:

FIGS. 3, 4 and 5 schematically illustrate different embodiments of the arrangement according to the invention.

FIG. 6 shows the layout of an arrangement according to the invention in a plant for the direct reduction of fine ore.

DESCRIPTION OF THE PREFERRED EMBODIMENTS

Figure 1:
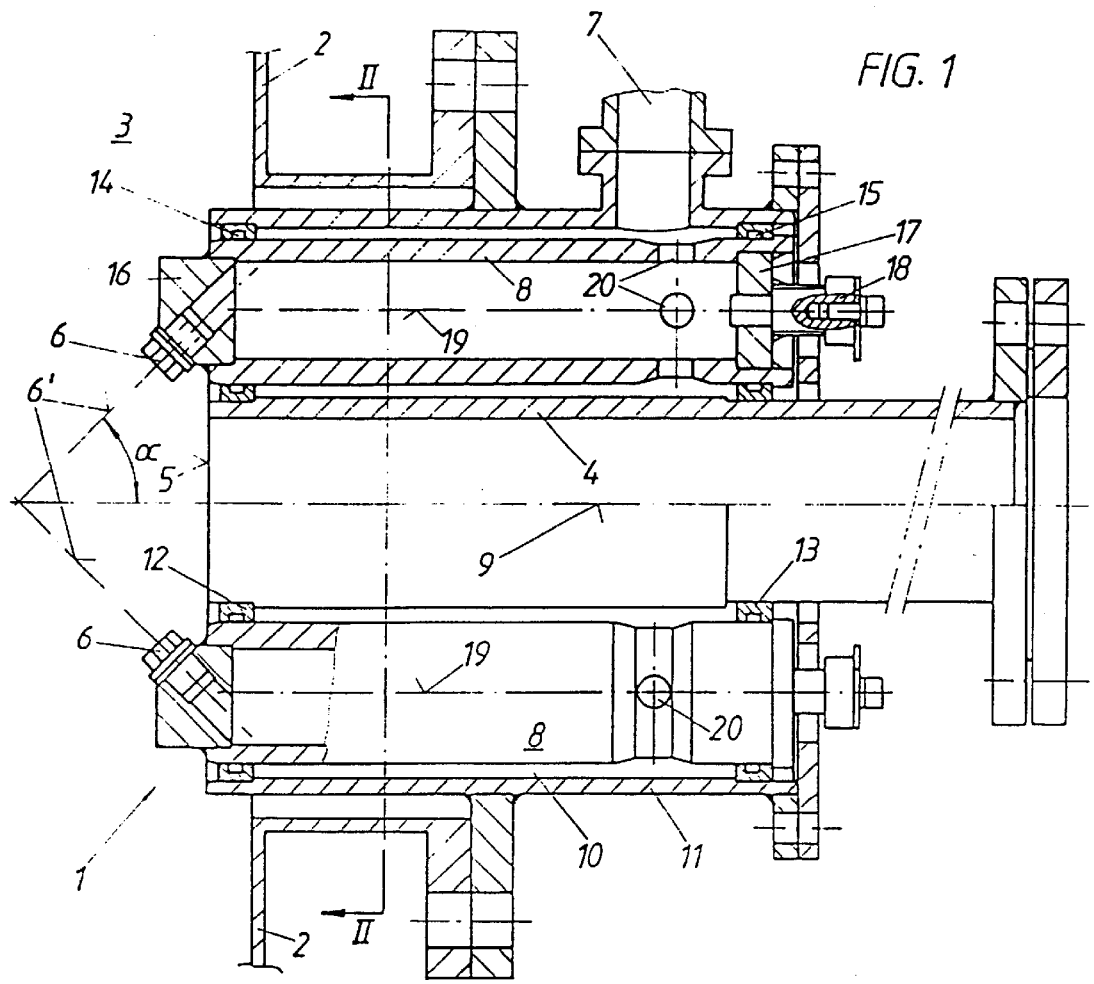
FIG. 1 shows a longitudinal section through an arrangement according to the invention.
Figure 2:
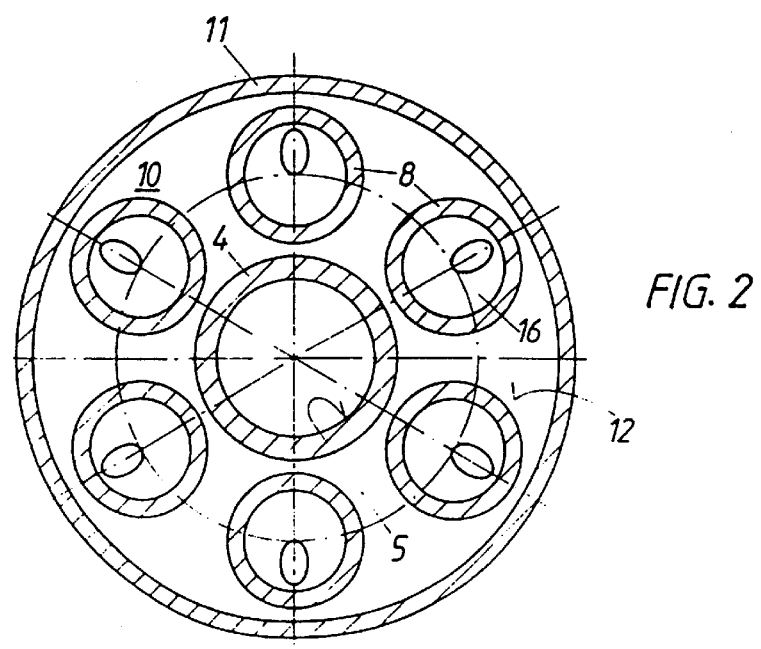
FIG. 2 shows a relevant cross section along line II—II of FIG. 1.

According to the embodiment represented in FIGS. 1 and 2, the arrangement for injecting metal-oxide-containing fine particles into a reducing gas is provided with injection nozzle 1 opening into space 3, which is penetrated by reducing gas, through wall 2. This space may be formed, for example, by a pipeline. Injection nozzle 1 is provided with central pipe 4 through which the fine particles are blown to its mouth 5 by means of a carrier gas so that a material stream formed by the fine particles is formed at the mouth.

At mouth 5 of central pipe 4, several nozzles 6 enclosing central pipe 4 peripherally are provided which are connected to gas duct 7 for feeding a secondary gas, via gas conducting pipes 8 each. These gas conducting pipes 8 are designed as pipes arranged in parallel with longitudinal center line 9 of central pipe 4, which are provided in annular space 10 enclosing central pipe 4 peripherally, into which space gas duct 7 runs. This annular space 10 is delimited by jacket 11 at the outside, which is closed at the end face at mouth 5 and at the opposite end face by means of end flanges 12, 13. Gas conducting pipes 8 can be turned in relation to end flanges 12, 13 by means of gastight bearings 14, 15.

The ends of gas conducting pipes 8 that are opposite to each other are closed with flanges 16, 17. At outer flanges 17, pivots 18 are mounted, which project outwards. At pivots 18, drives for turning the gas conducting pipes around their longitudinal axes 19 are provided, which are not represented in detail. At inside flanges 16 of gas conducting pipes 8, nozzles 6 are located whose axes 6' enclose an angle α with longitudinal center line 9 of the central pipe.

Gas conducting pipes 8 and, finally, nozzles 6 are supplied with gas via annular space 10 and openings 20 of gas conducting pipes 8.

By turning gas conducting pipes 8 around their longitudinal axes 19, the gas streams flowing from nozzles 6 can be varied as to their position in relation to the material stream in a way that the gas streams can be brought from a position intersecting longitudinal center line 9 of central pipe 4 into a position that is askew in relation to this longitudinal center line.

A means for turning gas conducting pipes 8 around their longitudinal axes 19 allows to periodically change the position of the gas streams in relation to the material stream. Angle α enclosed by the gas streams with longitudinal center line 9 of central pipe 4 ranges preferably between 20° and 60° and need not be equally large for all gas streams.

According to the embodiment represented in FIGS. 1 and 2, several nozzles 6 are arranged over the entire circumference of mouth 5 of central pipe 4 in such as way as to be distributed evenly. It may possibly suffice if several nozzles 6 are arranged only at one half of the circumference of mouth 5 of the central pipe 4, as shown e.g. in FIGS. 4 and 5. This is especially the case if the reducing gas in space 3 shows an intense directional flow.

It can be seen from FIGS. 3, 4 and 5 that the gas streams symbolized by arrows 21 are either oriented in a direction directly opposite to longitudinal center line 9 of the central pipe (FIG. 5) or askew to it (FIGS. 3, 4), the material stream proper, with a minimum diameter corresponding to mouth 5, still being hit by the gas streams. The gas streams thus impart to the material stream a rotation about its longitudinal center line 9, the fine particles exit from the material stream by the centrifugal forces and the latter is dispersed. This function occurs in addition to the atomizing effect caused by the gas streams.

The gas streams are preferably formed by an inert gas. Inert gas may also be used as carrier gas. Instead of nozzles 6 also an annular gap could be provided in end flange 12, through which a fan-shaped gas stream is directed against the material stream. If the position of the gas streams in relation to the material stream need not be changed, gas conducting pipes 8 are not required; in this case, nozzles 6 can be rigidly inserted in end flange 12.

As shown in FIG. 6 below, the layout of the arrangement according to the invention is described by a reducing gas discharge duct 23 conveying a reducing gas from melter gasifier 22, in which a reducing gas containing CO and $H_2$ is formed in a meltdown gasifying zone by coal gasification and reduced iron ore is melted, to a reduction vessel not represented. Both the reduction vessel in which ore is reduced and the melter gasifier can be designed, for example, as described in EP-A -0 576 414.

The reducing gas leaving melter gasifier 22 at opening 24 in dome region 25 of melter gasifier 22 is supplied to cyclone 26 via reducing gas discharge duct 23, in which cyclone the particles entrained by the reducing gas are separated.

In the starting region of reducing gas discharge duct 23, cooling gas is fed into the reducing gas via gas feeding means 27 in order to cool the reducing gas to the temperature required for reduction in the reduction vessel. Injection nozzle 1 according to the invention is located shortly thereafter, longitudinal center line 9 of central pipe 4 being oriented in a direction opposite to the direction of flow of the reducing gas and forming an angle between 100° and 160° with it.

The iron ore injected into the reducing gas and finely distributed in the latter immediately after entering into the reducing gas discharge duct is reduced, at least partially reduced, within reducing gas discharge duct 23 and separated in cyclone 26. The at least partially reduced iron ore is supplied via dust bins 27 and injector 28 operated preferably with nitrogen gas to dust burner 29 located at a side wall of melter gasifier 22. Dust burner 29 effects an agglomeration of the fine particles and optionally also complete reduction.

Additionally to iron ore also fine-grained metallurgical wastes or recyclings in oxidized and/or metallic form as well as possibly additionally carbon-containing materials can be charged via the arrangement according to the invention.

The arrangement according to invention allows to replace 15 to 30% of the ore by fine ore and/or metallurgical dusts, etc., which may also be mixed with contaminants.

What is claimed is:

1. A process for injecting metal-oxide-bearing fine particles into a reducing gas stream conveyed by a reducing gas line, characterized in that a central material stream formed by the fine particles and a carrier gas is introduced into the reducing gas stream and the reducing gas flows toward the material stream, the material stream being oriented in a direction opposite to the direction of flow of the reducing gas, and at least one gas stream formed by a secondary gas is directed against the material stream, with the gas stream dispersing the material stream and the fine particles being evenly distributed within the reducing gas stream.

2. A process according to claim 1, characterized in that the gas stream imparts to the material stream a moment of rotation about the axis of the material stream, and due to the centrifugal forces the fine particles exit from the material stream and the latter is dispersed.

3. A process according to claim 2, characterized in that the gas stream imparts moments of rotation to the material stream in a periodically fluctuating manner.

4. A process according to claim 2, characterized in that the gas stream is directed against the material stream askew and in such a manner as to intersect the material stream and only penetrates the outer zones of the material stream.

5. A process according to claim 4, characterized in that the angle ($\alpha$) between the gas stream and the material stream is varied periodically.

6. A process according to claim 1, characterized in that the gas stream is formed by inert gas.

7. A process according to claim 1, characterized in that at least one gas gas stream is directed against the center of the material stream and penetrates the latter.

8. A process according to claim 1, characterized in that the material stream is fed into a reducing gas stream that exits from a meltdown gasifying zone in which a reducing gas containing CO and $H_2$ is formed by coal gasification and partially and/or completely reduced metal containing particles are completely reduced or melted, respectively, and said reducing gas stream is subjected to solids separation after the material stream has entered and subsequently is reacted in a reduction zone by reduction of a metal-oxide-containing ore, the fine particles separated during solids separation being supplied to the meltdown gasifying zone via a dust burner (29) effecting an agglomeration of the fine particles.

9. An arrangement for carrying out the process according to claim 1, characterized by the combination of the following characteristic features:

a space (3) for receiving a reducing gas delimited by a wall (2, 23), an injection nozzle (1) for injecting a material stream, said injection nozzle entering the space (3) through the wall (2, 23), provided with a central pipe (4) for conducting fine particles and a carrier gas and at least one nozzle (6) connected to a gas duct (7) for feeding a secondary gas at the mouth (5) of the central pipe (4), the longitudinal axis (6') of the nozzle (6) and the longitudinal center line (9) of the central pipe (4) including an angle ($\alpha$), said angle $\alpha$ being such that the material stream is oriented opposite to the direction of flow of the reducing gas.

10. An arrangement according to claim 9, characterized in that the angle ($\alpha$) ranges between 20° and 60°.

11. An arrangement according to claim 9, characterized in that the longitudinal axis (6') of the nozzle (6) is oriented askew relative to the longitudinal center line (9) of the central pipe (4), wherein, if the longitudinal axis (6') of the nozzle (6) is projected perpendicularly onto a plane laid through the longitudinal center line (9) of the central pipe (4) and the nozzle mouth, an angle ($\alpha$) ranging between 20° and 60° is formed between the projected longitudinal axis (6') of the nozzle (6) and the longitudinal center line (9) of the central pipe (4).

12. An arrangement as claimed in claim 9, characterized in that the nozzle (6) is movably arranged at the mouth (5) of the central pipe (4) and with its longitudinal axis (6') is capable of assuming different positions relative to the longitudinal center line (9) of the central pipe (4).

13. An arrangement according claim 9, characterized in that several nozzles (6) are arranged only at one half of the circumference of the mouth (5) of the central pipe (4).

14. An arrangement according to claim 9, characterized in that several nozzles (6) are arranged over the entire circumference of the mouth (5) of the central pipe (4) in such a way as to be distributed approximately evenly.

15. An arrangement according to claim 9, characterized in that the longitudinal center line (9) of the injection nozzle (1) and the axis of the pipe (23) conveying the reducing gas include an angle ranging between 100° and 160°.

16. An arrangement according to claim 9, characterized in that the longitudinal axis (6') of at least one nozzle (6) intersects the longitudinal center line (9) of the central pipe (4).

17. An arrangement according to claims 9, characterized in that the arrangement opens into a gas discharge pipe (23) departing from a melter gasifier (22) for melting and optionally completely reducing metal ores as well as for producing a reducing gas containing CO and $H_2$ by coal gasification and the gas discharge pipe (23) opens into a solids seperator (26), such as a cyclone, from which the solids separated in the solids seperator (26) via a solids recircling duct and a dust burner (29) can be recircled into the melter gasifier (22).

18. A process according to claim 3, wherein the moments of rotation are of different dimensions.

19. A process according to claim 1, wherein the material steam is oriented at an angle between 100° and 160° opposite to the direction of flow of the reduction gas.

20. An arrangement as claimed in claim 12, wherein said longitudinal axis (6) is capable of assuming askew positions relative to the longitudinal center line (9) of the central pipe (4).

* * * * *

UNITED STATES PATENT AND TRADEMARK OFFICE
CERTIFICATE OF CORRECTION

PATENT NO. : 6,273,933 B1
DATED : August 24, 2001
INVENTOR(S) : Leopold Werner Kepplinger et al.

It is certified that error appears in the above-identified patent and that said Letters Patent is hereby corrected as shown below:

<u>Title page,</u>
Item [73], please amend the Assignee information to reflect three assignees:
-- Voest-Alpine Industrieanlagenbau GmbH, Linz (AT), Pohang Iron & Steel Co., Ltd., Kyong Sang Book-Do, (KR); and Research Institute of Industrial Science & Technology, Incorporated Foundation, Pohang City, (KR) --.

Signed and Sealed this

Twenty-sixth Day of February, 2002

*Attest:*

*Attesting Officer*

JAMES E. ROGAN
*Director of the United States Patent and Trademark Office*